United States Patent
Shirashima

(10) Patent No.: US 12,049,781 B2
(45) Date of Patent: Jul. 30, 2024

(54) IN-VEHICLE DEVICE

(71) Applicant: ALPS ALPINE CO., LTD., Tokyo (JP)

(72) Inventor: Hitoshi Shirashima, Iwaki (JP)

(73) Assignee: ALPS ALPINE CO., LTD., Tokyo (JP)

( * ) Notice: Subject to any disclaimer, the term of this patent is extended or adjusted under 35 U.S.C. 154(b) by 437 days.

(21) Appl. No.: 17/534,739

(22) Filed: Nov. 24, 2021

(65) Prior Publication Data

US 2022/0170309 A1    Jun. 2, 2022

(30) Foreign Application Priority Data

Dec. 1, 2020 (JP) .................................. 2020-199566

(51) Int. Cl.
| | |
|---|---|
| *E05F 15/70* | (2015.01) |
| *B60K 35/60* | (2024.01) |
| *E05F 5/00* | (2017.01) |
| *E05F 15/603* | (2015.01) |
| *F16H 57/12* | (2006.01) |
| *B60K 35/22* | (2024.01) |
| *F16H 37/12* | (2006.01) |

(52) U.S. Cl.
CPC .............. *E05F 15/70* (2015.01); *B60K 35/60* (2024.01); *E05F 5/00* (2013.01); *E05F 15/603* (2015.01); *F16H 57/12* (2013.01); *B60K 35/22* (2024.01); *E05Y 2201/22* (2013.01); *E05Y 2201/224* (2013.01); *E05Y 2201/434* (2013.01); *E05Y 2201/702* (2013.01); *E05Y 2201/704* (2013.01); *E05Y 2201/716* (2013.01); *E05Y 2201/722* (2013.01); *E05Y 2400/40* (2013.01); *E05Y 2900/538* (2013.01); *F16H 37/122* (2013.01)

(58) Field of Classification Search
CPC ...... E05F 15/70; H05K 5/0204; H05K 5/0221
See application file for complete search history.

(56) References Cited

U.S. PATENT DOCUMENTS

| | | | |
|---|---|---|---|
| 10,585,455 B1 * | 3/2020 | Barnes .................. | G06F 1/1626 |
| 11,932,264 B2 * | 3/2024 | Clifton .............. | B60W 50/0098 |
| 2019/0003238 A1 * | 1/2019 | Sugiyama ............... | E05F 15/70 |
| 2023/0085770 A1 * | 3/2023 | Jang .......................... | H02P 3/12 |
| | | | 49/324 |

FOREIGN PATENT DOCUMENTS

| | | |
|---|---|---|
| JP | 2008-302715 A | 12/2008 |
| JP | 5084352 B2 | 11/2012 |

* cited by examiner

*Primary Examiner* — Anthony Q Edwards
(74) *Attorney, Agent, or Firm* — Crowell & Moring LLP

(57) ABSTRACT

An in-vehicle device includes: a movable member; a motor that moves the movable member; at least one detection switch that detects movement of the movable member; and a controller that controls the motor based on a detected output of the detection switch. The in-vehicle device further includes: a locking mechanism unit that, upon determination by the controller based on the detected output from the detection switch that the movable member reaches an end point region in a movement direction, locks the movable member, and upon determination by the controller that a main switch is set to OFF, releases the lock; and a motor driver that, after the release of the lock by the locking mechanism unit, upon determination by the controller based on the detected output from the detection switch that the movable member is moved again, drives the motor to move the movable member.

7 Claims, 9 Drawing Sheets

IN-VEHICLE DEVICE

RELATED APPLICATION

The present application claims priority to Japanese Patent Application Number 2020-199566, filed Dec. 1, 2020, the entirety of which is hereby incorporated by reference.

BACKGROUND

1. Field

The present disclosure relates to an in-vehicle device in which a movable member equipped with a display device or the like is moved by the power of a motor.

2. Description of the Related Art

Japanese Unexamined Patent Application Publication No. 2008-302715 describes an in-vehicle display device.

In that in-vehicle display device, an upper panel is rotatably supported via a shaft on an upper portion of the instrument panel, and an arc-shaped rack support member is fixed to the upper panel on the near side of the shaft. A support projection provided at an upper portion of a display member is rotatably supported by the rack support member, and a sliding projection provided at a lower portion of the display member is slidably supported by a sliding groove formed in a side plate of the in-vehicle display device. A drive mechanism is provided with a drive motor and a transmission cluster gear, and the last-stage transmission gear of the transmission cluster gear is engaged with a rack engagement section of the rack support member. A worm is fixed to the output shaft of the drive motor, and the transmission cluster gear is provided with a worm wheel engaged with the worm.

When the ignition switch is OFF, the in-vehicle display device is in a storage posture in which the display member is lowered. When the ignition switch is set to ON, the drive motor is started, its power is transmitted to the rack support member, and the upper panel is rotated upward and the display member is raised. In the in-vehicle display device, the rotation posture of the upper panel is settable in two stages, and the display member is set to a first visual position in which part of the display screen is directed to the vehicle interior, and a second visual position in which the display screen is displayable on a wider range.

SUMMARY OF THE DISCLOSURE

In the in-vehicle display device shown in Japanese Unexamined Patent Application Publication No. 2008-302715, backlash occurs between the gears of the transmission cluster gear provided in the drive mechanism, and rattling occurs in a connecting member between the display member and the upper panel. Thus, the display member rattles due to vibration of the vehicle body, which causes a problem of noise generation.

In the case where the display member is at the first visual position or the second visual position, when the ignition switch is set to OFF, the display member may be stopped while remaining at the current visual position according to the specifications. Then, when the display member is forcibly set to the storage posture by pressing the display member downward by a hand, the drive motor and the transmission cluster gear provided in the drive mechanism each act as a load, and thus it is difficult to move the display member to be in the storage posture. Particularly, as described in Japanese Unexamined Patent Application Publication No. 2008-302715, when the power transmission path of the drive mechanism includes an engagement structure between the worm and the worm wheel, the reduction ratio is high, and thus the load when the display member is moved by a manual operation becomes excessively high.

The present disclosure aims to solve the above-described conventional problem, among others. It is further an object of the present disclosure to provide an in-vehicle device capable of preventing rattling of a movable member, as well as easily moving the movable member when the main switch is OFF.

The present disclosure provides an in-vehicle device including: a movable member; a motor that moves the movable member; at least one detection switch that detects movement of the movable member; and a controller that controls the motor based on a detected output of the detection switch. The in-vehicle device further includes: a locking mechanism unit that, upon determination by the controller based on the detected output from the detection switch that the movable member reaches an end point region in a movement direction, locks the movable member, and upon determination by the controller that a main switch is set to OFF, releases the lock; and a motor driver that, after the release of the lock by the locking mechanism unit, upon determination by the controller based on the detected output from the detection switch that the movable member is moved again, drives the motor to move the movable member.

In the in-vehicle device of the present disclosure, in the locking mechanism unit, when the movable member is moved in a first direction, and the movable member is determined to reach the end point region based on the detected output from the detection switch, the motor is driven in a direction for which the movable member is pressed in the first direction, then stopped to eliminate occurrence of backlash in a gear in a power transmission path in a drive mechanism, and the movable member is self-locked, when the main switch is set to OFF, the self-locking is released by causing backlash to occur in the gear, and when the movable member is moved with the backlash occurred, the movable member is determined to be moved again.

The in-vehicle device of the present disclosure preferably includes a stopper that regulates movement of the movable member in the first direction. In the locking mechanism unit, backlash is eliminated by pressing the movable member against the stopper by power of the motor.

In the in-vehicle device of the present disclosure, in the locking mechanism unit, when the main switch is set to OFF, the motor is preferably driven for a short time in a rotational direction for causing the movable member to move in a second direction so that backlash occurs, the second direction being opposite to the first direction.

The in-vehicle device of the present disclosure preferably includes an engagement section between a worm and a worm wheel provided in an output shaft of the motor.

In the in-vehicle device of the present disclosure, the locking mechanism unit may be an electromagnetic brake provided in a power transmission path from the motor to the movable member.

In the in-vehicle device of the present disclosure, for example, the main switch is an accessory switch of an automobile.

In the in-vehicle device of the present disclosure, when the movable member reaches the end point region, the power transmission in the drive mechanism is in a locked state, thus when vibration of vehicle body occurs, the occurrence of rattling of the movable member can be prevented.

For example, even when the display device provided in the movable member is large, and the mass of the movable member is increased, it is possible to prevent the occurrence of noise due to rattling at the time of running of the vehicle.

When the main switch of an accessory switch of an automobile is set to OFF, the locked state of the power transmission is released, thus the detection switch can be operated by manually moving the movable member again only for the minute distance with a lowest load, and the movable member can be moved to the other end point region by driving the motor based on the detection output of the detection switch.

DESCRIPTION OF THE PREFERRED EMBODIMENTS

Entire Structure of In-Vehicle Device 10

Figure 1:
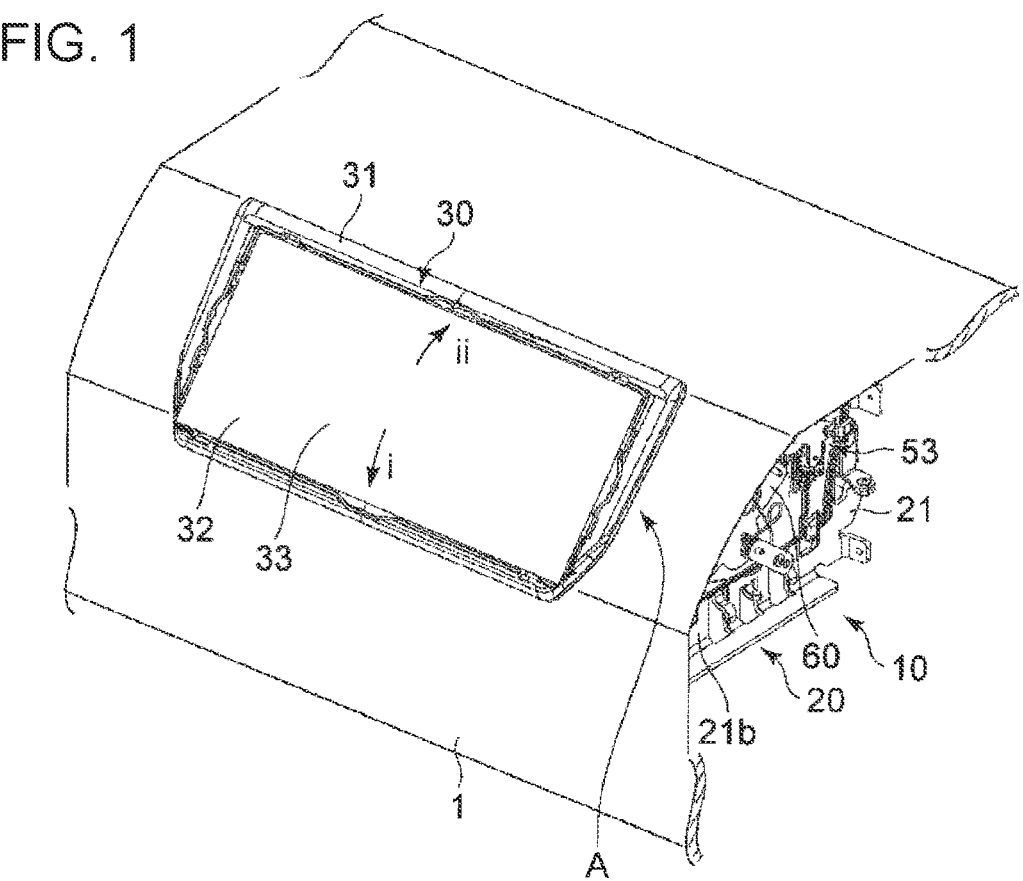
FIG. 1 is a perspective view illustrating a state in which an in-vehicle device of an embodiment of the present disclosure is installed in a panel in the vehicle interior, and a movable member has been moved in a closing direction (a first direction).
Figure 2:
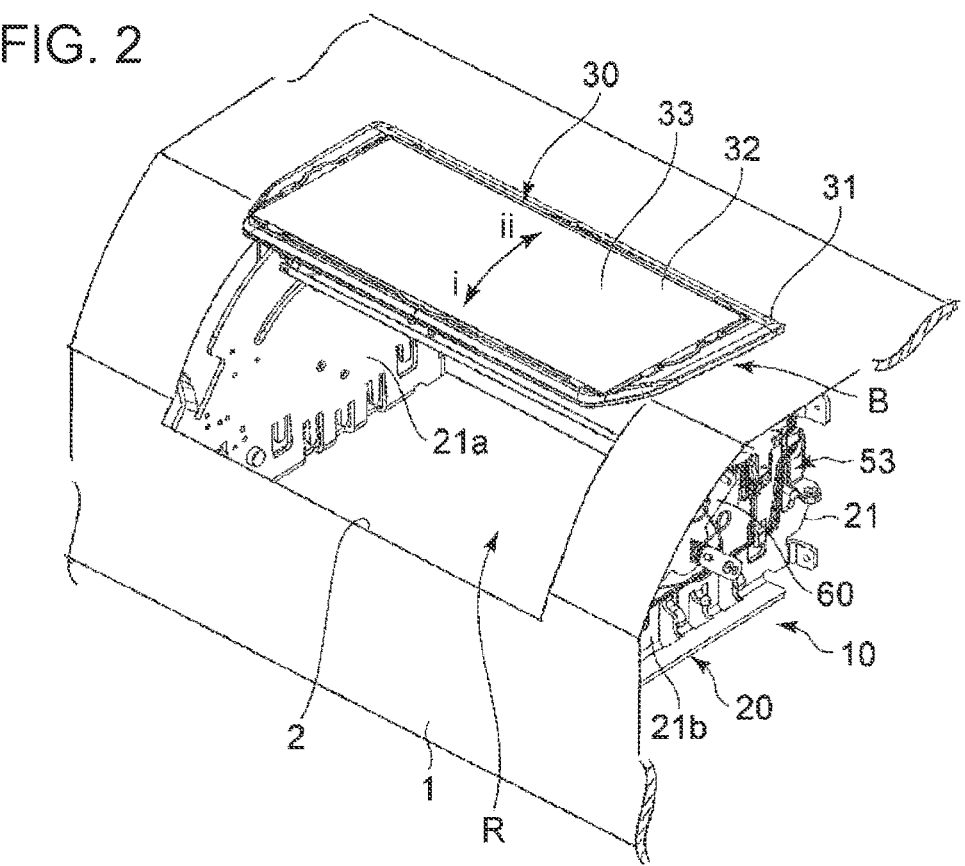
FIG. 2 is a perspective view illustrating a state in which the in-vehicle device of the embodiment of the present disclosure is installed in the panel in the vehicle interior, and the movable member has been moved in an open direction (a second direction).

FIGS. 1 and 2 illustrate a panel 1 in the vehicle interior of an automobile. The panel 1 is an instrument panel or a dashboard disposed at a front portion of the vehicle interior. As illustrated in FIG. 2, a panel opening 2 open to the vehicle interior is formed in the panel 1.

Figure 5:
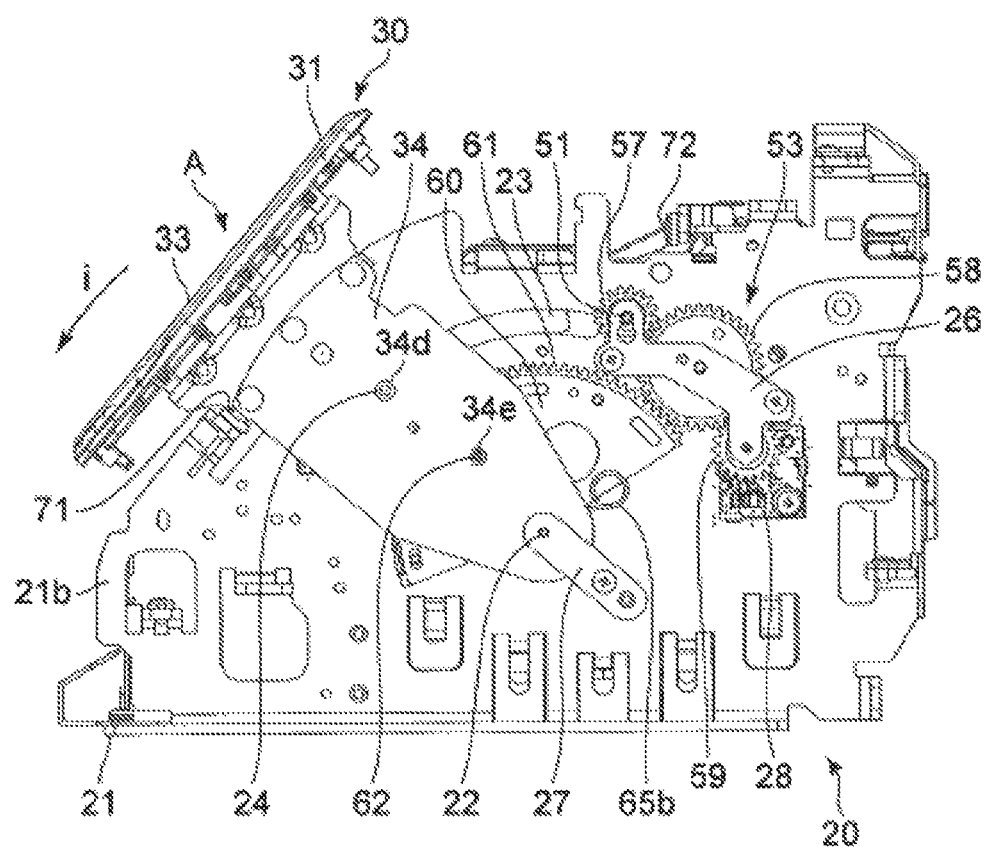
FIG. 5 is a right side view illustrating the entire structure of the in-vehicle device in which the movable member has been moved in the closing direction (the first direction).
Figure 6:
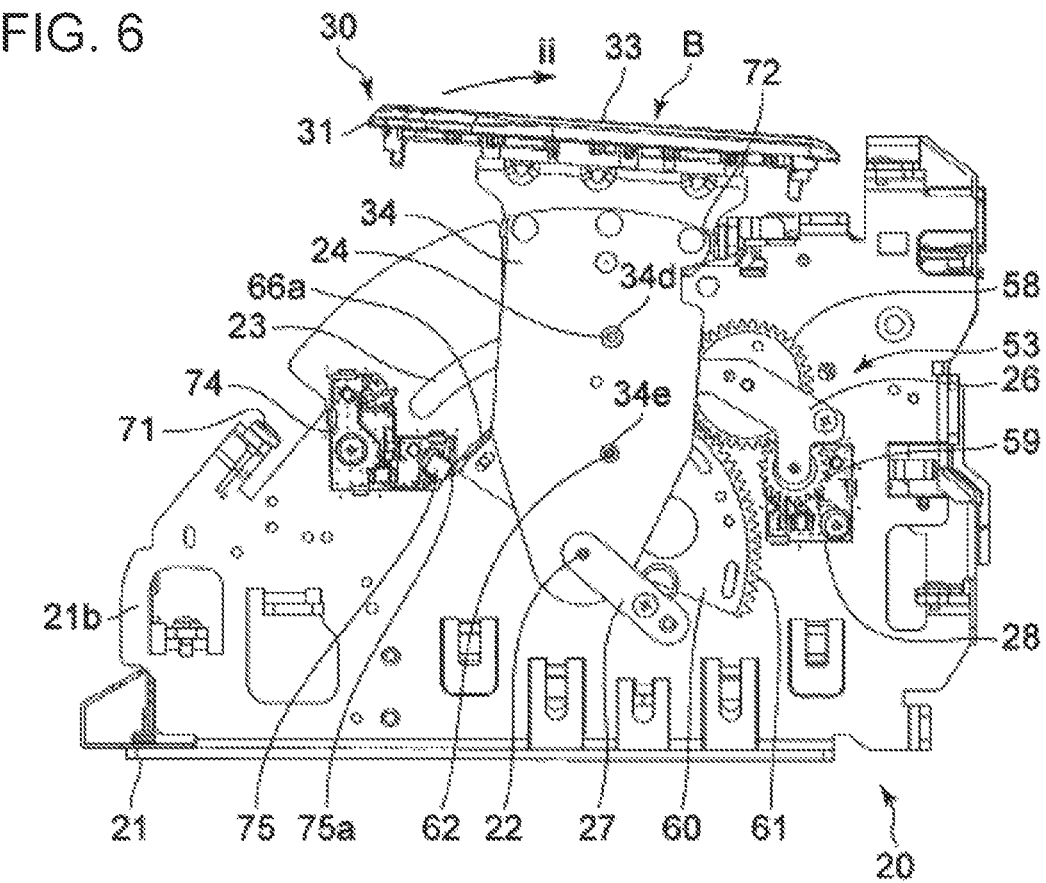
FIG. 6 is a right side view illustrating the entire structure of the in-vehicle device in which the movable member has been moved in the open direction (the second direction).

The in-vehicle device 10 of the embodiment of the present disclosure is installed inside (on the inner side of) the panel 1. In the in-vehicle device 10, the left side is referred to as X1 side and the right side is referred to as X2 side. The in-vehicle device 10 has a main body 20, and a movable member 30 movably supported by the main body 20. As illustrated also in FIGS. 5 and 6, the movable member 30 is movably supported by the main body 20 in a first direction (i) which is a closing direction and a second direction (ii) which is an open direction. As illustrated in FIGS. 1 and 5, when the movable member 30 is stopped at a "movement end point" in the first direction (i), the movable member 30 is in a first posture (A) which is a closed posture, and as illustrated in FIGS. 2 and 6, when the movable member 30 is stopped at a "movement end point" in the second direction (ii), the movable member 30 is in a second posture (B) which is an open posture.

Figure 3:
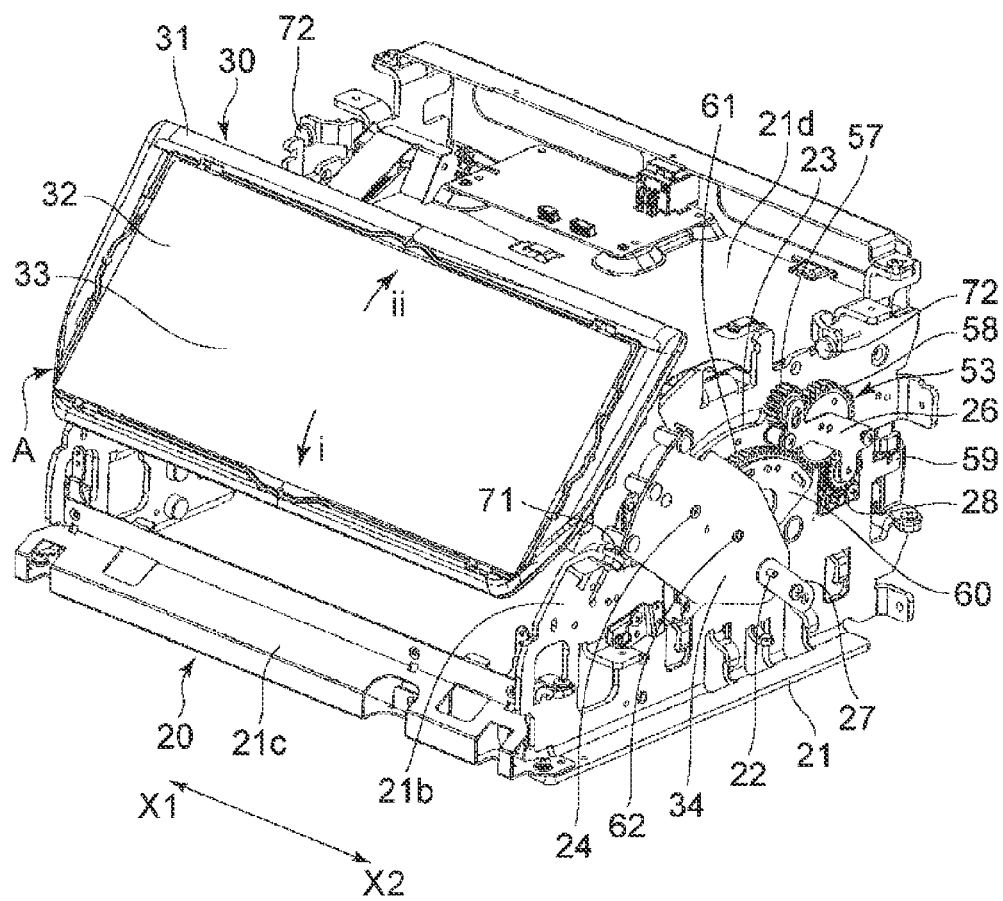
FIG. 3 is a perspective view illustrating the entire structure of the in-vehicle device in which the movable member is moved in the closing direction (the first direction).

As illustrated in FIG. 3, the movable member 30 has a movable housing 31, and a display device 32 held by the movable housing 31. The display device 32 includes a color liquid crystal display panel, and a backlight panel disposed on the back thereof. Alternatively, the display device 32 may have an electroluminescent display panel. As illustrated in FIGS. 1 and 2, a display screen 33 of the display device 32 appears on a wide area on the surface of the movable housing 31. The display screen 33 is provided with a capacitive touch panel or a resistive touch sensor. In addition, the movable housing 31 is provided with operation buttons on the front surface at a position away from the display screen 33. As illustrated in FIG. 1, when the movable member 30 is stopped in the first posture (A) which is a closed posture, the opening 2 of the panel 1 is closed by the movable member 30. Then the display screen 33 of the movable member 30 is set to the forward side of the panel, in other words, set in a posture which allows the display screen 33 to be easily seen in the vehicle interior.

As illustrated in FIG. 2, when the movable member 30 is stopped in the second posture (B) which is an open posture, the movable member 30 is positioned above the opening 2, and the opening 2 is exposed. A storage space (R) is formed inside the main body 20 of the in-vehicle device 10, and when the movable member 30 is in the second posture (B), the storage space (R) appears inside the opening 2 of the panel 1. The storage space (R) is used as an accessory case or the like. Alternatively, a structure may be adopted in which a disk drive device and a memory installation device are mounted on the main body, and when the movable member 30 is in the second posture (B), these devices appear through the opening 2.

Figure 4:
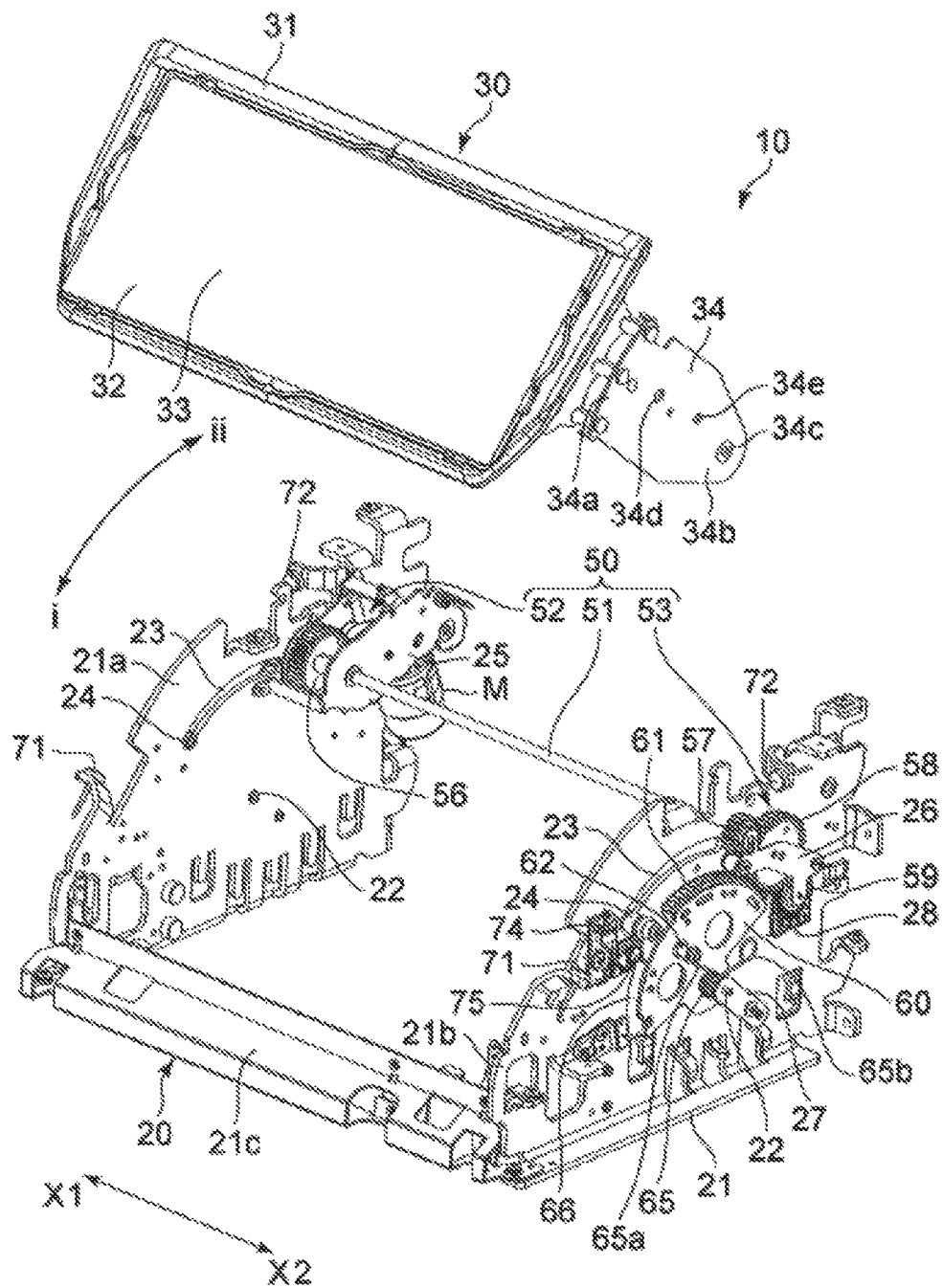
FIG. 4 is an exploded perspective view illustrating the structure of a main part of the in-vehicle device illustrated in FIG. 3.

As illustrated in FIGS. 3 and 4, the main body 20 of the in-vehicle device 10 has a main body housing 21 made of metal. The main body housing 21 has a left side plate 21a on the left side (X1 side), a right side plate 21b on the right side (X2 side), and a forward coupler 21c that couples the left side plate 21a and the right side plate 21b at a forward position. As illustrated in FIG. 3, the main body housing 21 is provided with a top plate 21d that couples the left side plate 21a and the right side plate 21b at an upper position. However, the top plate 21d is removed in FIG. 4.

The in-vehicle device 10 is provided with a rotatable arm 34 on the left side (X1 side) and on the right side (X2 side). A pair of rotatable arms 34 on the right and left have a plane symmetric shape in a horizontal direction (X1-X2 direction). As illustrated in FIGS. 3 and 4, the right side of the movable housing 31 of the movable member 30 is fixed to a rotating-side end 34a of the rotatable arm 34 by screws, and the left side of the movable housing 31 is also fixed to the rotating-side end 34a of the rotatable arm 34.

As illustrated in FIGS. 4, 5 and 6, a support pivot 22, and an arc guiding long hole 23 along an arc path having a center at the support pivot 22 are formed in both the left side plate 21a and right side plate 21b of the main body housing 21. The respective support pivots 22 and arc guiding long holes 23 of the left side plate 21a and the right side plate 21b have a plane symmetric structure in a horizontal direction. As illustrated in FIG. 4, a support hole 34c is open in a support-side base 34b of the rotatable arm 34, and as illustrated in FIGS. 5 and 6, the support hole 34c is rotatably mounted on the support pivot 22. As illustrated in FIG. 4, a sliding shaft 24 is slidably inserted in the arc guiding long hole 23 formed in each of the left side plate 21a and the right side plate 21b, and as illustrated in FIGS. 5 and 6, the sliding shaft 24 is fixed to a shaft fixing hole 34d formed in the rotatable arm 34.

In the left side plate 21a and the right side plate 21b of the main body housing 21, while the rotatable arm 34 is being guided to the arc guiding long hole 23, the support shaft 22 is rotated as a pivot, thus the movable member 30 is moved between the first posture (A) illustrated in FIG. 5 and the second posture (B) illustrated in FIG. 6.

Structure of Drive Mechanism 50

As illustrated in FIG. 4, the movable member 30 and the drive mechanism 50 to drive the rotatable arm 34 are provided between the left side plate 21a and the right side plate 21b of the main body housing 21. The drive mechanism 50 includes a transmission shaft 51 provided between the left side plate 21a and the right side plate 21b, a motor driver 52 provided inside the left side plate 21a, a rotation driver 53 provided outside the right side plate 21b, and a drive rotating body 60 driven by the rotation driver 53. The transmission shaft 51 is rotatably supported by the left side plate 21a and the right side plate 21b. Note that the rotation driver 53 is also provided outside the left side plate 21a, and the rotation driver 53 outside the left side plate 21a and the rotation driver 53 outside the right side plate 21b have a plane symmetric structure in a horizontal direction (X1-X2 direction).

Figure 9:
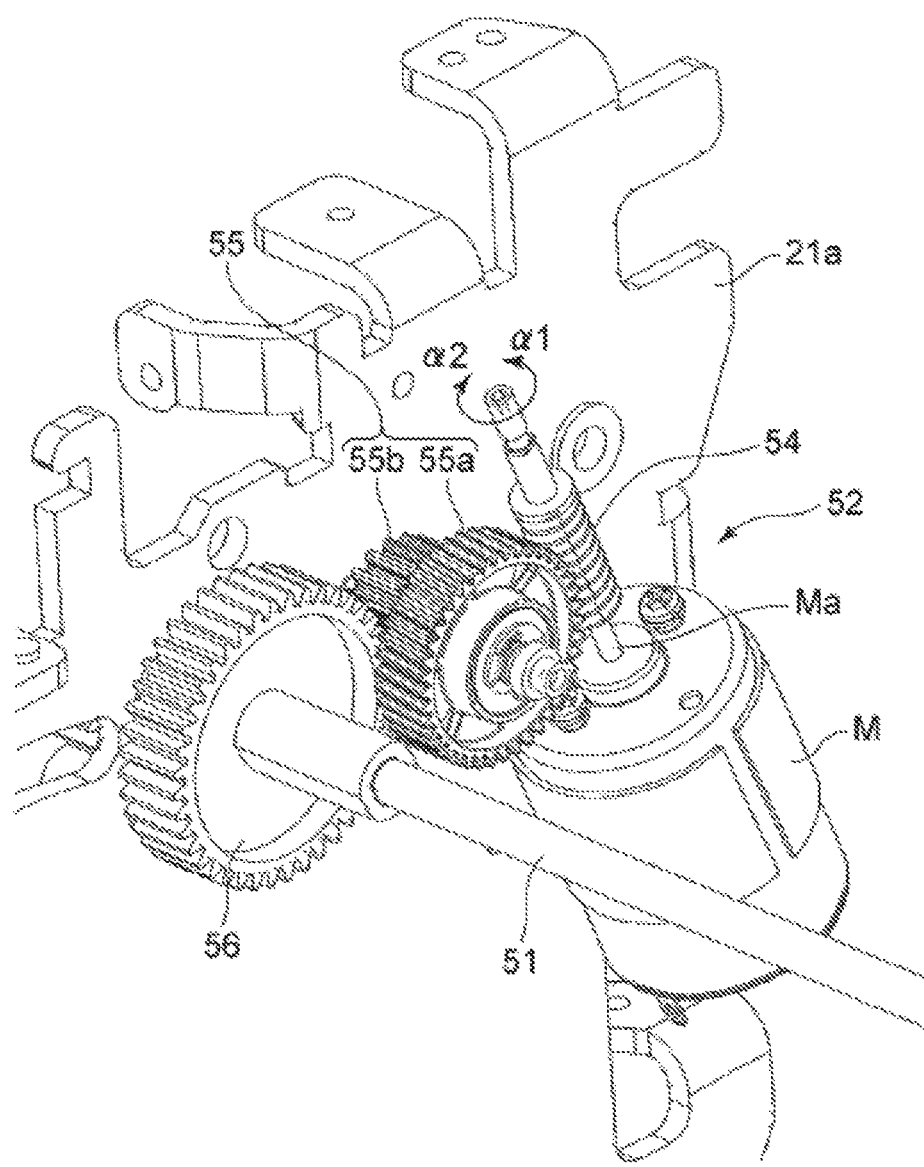
FIG. 9 is a partial perspective view illustrating a motor and a reduction cluster gear provided in the drive mechanism.

As illustrated in FIG. 4, a drive bracket 25 is fixed inside the left side plate 21a, and the motor driver 52 is provided between the left side plate 21a and the drive bracket 25. FIG. 9 illustrates an enlarged view of the motor driver 52 with the drive bracket 25 removed. The motor driver 52 is provided with the motor M. The motor M is fixed to the drive bracket 25.

As illustrated in FIG. 9, in the motor driver 52, a worm 54 is fixed to an output shaft Ma of the motor M, and a two-stage gear 55 is rotatably supported by the drive bracket 25. The two-stage gear 55 is such that a worm wheel 55a and a small diameter spur gear 55b are integrally formed with each other, and the worm 54 is engaged with the worm wheel 55a. A spur gear 56 is fixed to the transmission shaft 51, and the small diameter spur gear 55b is engaged with the spur gear 56. The diameter of the pitch circle of the small diameter spur gear 55b is less than the diameter of the pitch circle of the worm wheel 55a, and the diameter of the pitch circle of the spur gear 56 is greater than the diameter of the pitch circle of the small diameter spur gear 55b.

In FIGS. 4, 5 and 6, the rotation driver 53 provided outside the right side plate 21b is illustrated. The drive bracket 26 is fixed on the outside of the right side plate 21b, and the rotation driver 53 is disposed between the outer surface of the right side plate 21b and the drive bracket 26. In the rotation driver 53, the right end of the transmission shaft 51 projects outwardly of the right side plate 21b, and a transmission small gear 57 is fixed to the right end of the transmission shaft 51. A pinion gear 58 is rotatably supported by the drive bracket 26, and the transmission small gear 57 and the pinion gear 58 are engaged with each other. The diameter of the pitch circle of the transmission small gear 57 is less than the diameter of the pitch circle of the pinion gear 58.

In the drive mechanism 50, the power transmission path from the worm 54 of the motor driver 52 to the spur gear 56 is a reduction gear train, and in addition, the power transmission path from the transmission small gear 57 of the rotation driver 53 to the pinion gear 58 is also a reduction gear train. When the motor M is started and the output shaft Ma is rotated, the transmission shaft 51 along with the spur gear 56 is decelerated and rotated, and in addition, the pinion gear 58 is decelerated and rotated through the transmission small gear 57.

As illustrated in FIGS. 5 and 6, in the rotation driver 53, a detection gear 59 is rotatably supported by the drive bracket 26, and the detection gear 59 is engaged with the pinion gear 58. The diameter of the pitch circle of the detection gear 59 is less than the diameter of the pitch circle of the pinion gear 58. Therefore, the rotation of the pinion gear 58 is increased and transmitted to the detection gear 59. A detection board 28 is fixed to the right side plate 21b, and the detection board is mounted with a detection element that detects the rotational direction and the number of rotations of the detection gear 59.

As illustrated in FIG. 4, a support bracket 27 is fixed to the right side plate 21b, and the support shaft 22 is fixed between the right side plate 21b and the support bracket 27. The support hole 34c formed at the support-side base 34b of the rotatable arm 34 is rotatably supported by the support shaft 22 between the right side plate 21b and the support bracket 27.

As illustrated in FIGS. 5 and 6, the sector-shaped drive rotating body 60 is rotatably supported by the support shaft 22 between the right side plate 21b and the rotatable arm 34. The drive rotating body 60 constitutes part of the drive mechanism 50. A sector gear portion 61 is formed at the drive rotating body 60, and is engaged with the pinion gear 58. As illustrated in FIG. 4, a coupling shaft 62 is fixed to the drive rotating body 60. In the rotatable arm 34, a connection fixing hole 34e is formed between the support hole 34c and the shaft fixing hole 34d, and as illustrated in FIGS. 5 and 6, the coupling shaft 62 is fixed to the connection fixing hole 34e. The drive rotating body 60 and the rotatable arm 34 are rotatably supported by the support shaft 22 in common, and are coupled by the coupling shaft 62 and integrally rotated.

Figure 7:
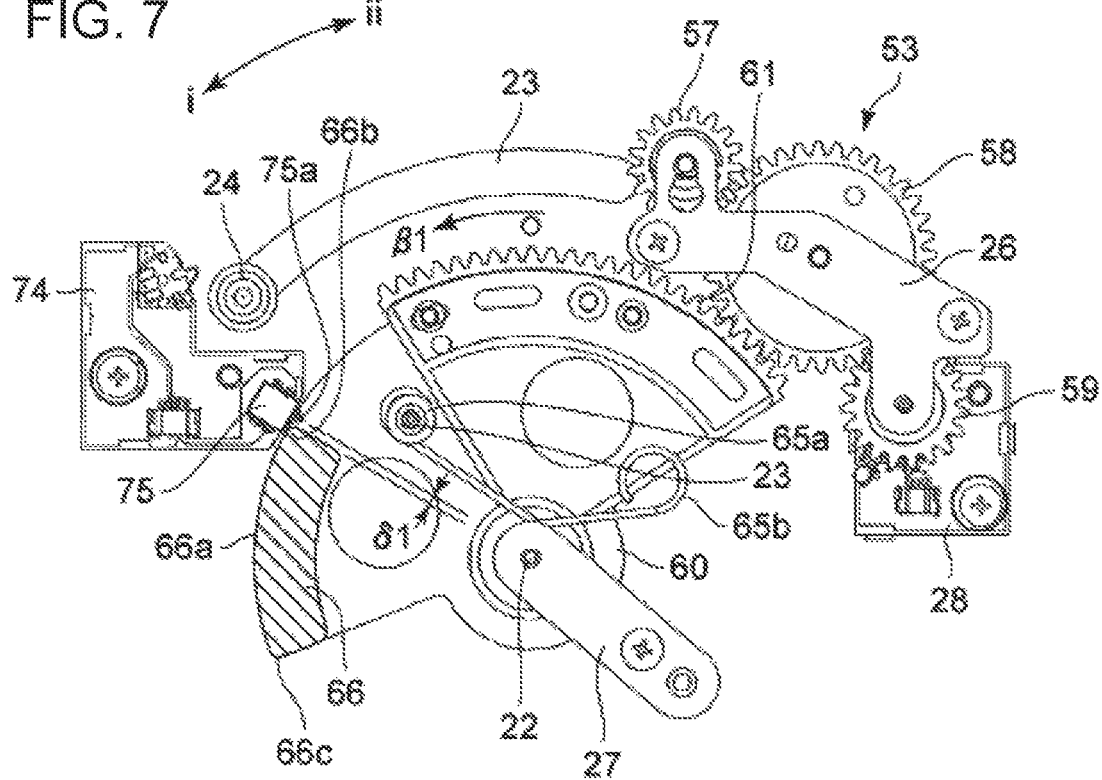
FIG. 7 is a partial right side view illustrating part of a drive mechanism when the movable member is being moved in the closing direction (the first direction).

As illustrated in FIGS. 4 and 7, between the drive rotating body 60 and the support bracket 27, the winding portion of a torsion spring 65 is mounted on the support shaft 22 which supports the rotatable arm 34. One arm 65a of the torsion spring 65 is hung on the coupling shaft 62. The other arm 65b of the torsion spring 65 is fixed to a fixed plate (not illustrated) disposed away outwardly of the further right side (X2 side) of the right side plate 21b. The drive rotating body 60 is urged by the elastic force of the torsion spring 65 in the counterclockwise direction (β1 direction). The urging force regulates the occurrence of rattling and noise due to the backlash in the engagement sections of gears during the operation of the drive mechanism 50.

As described above, the rotatable arm 34, the rotation driver 53 and the drive rotating body 60 are also provided on the outside (X1 side) of the left side plate 21a. When the motor M of the motor driver 52 illustrated in FIG. 9 is started, its power is transmitted to the transmission shaft 51, and the rotation driver 53 provided on the outside (X1 side) of the left side plate 21a and the rotation driver 53 provided on the outside (X2 side) of the right side plate 21*b* are operated in synchronization. The drive rotating body 60 and the rotatable arm 34 are rotated together on the outside of the left side plate 21*a* and on the outside of the right side plate 21*b*, and the movable member 30 is rotated (moved) in the first direction (i) and the second direction (ii).

As illustrated in FIG. 4, a first stopper 71 is provided on the first direction (i) side and a second stopper 72 is provided on the second direction (ii) side on respective upper portions of the left side plate 21*a* and the right side plate 21*b* of the main body housing 21. As illustrated in FIG. 5, when the movable member 30 reaches a "movement end point" in the first direction (i), the rotatable arm 34 provided on each of both sides of the horizontal direction (X1-X2 direction) comes into contact with the first stopper 71, the rotation of the rotatable arm 34 is stopped, and the movable member 30 is in the first posture (A). As illustrated in FIG. 6, when the movable member 30 reaches a "movement end point" in the second direction (ii), the rotatable arm 34 comes into contact with the second stopper 72, the rotation of the rotatable arm 34 is stopped, and the movable member 30 is in the second posture (B).

Structure of Detection Mechanism

Figure 8:
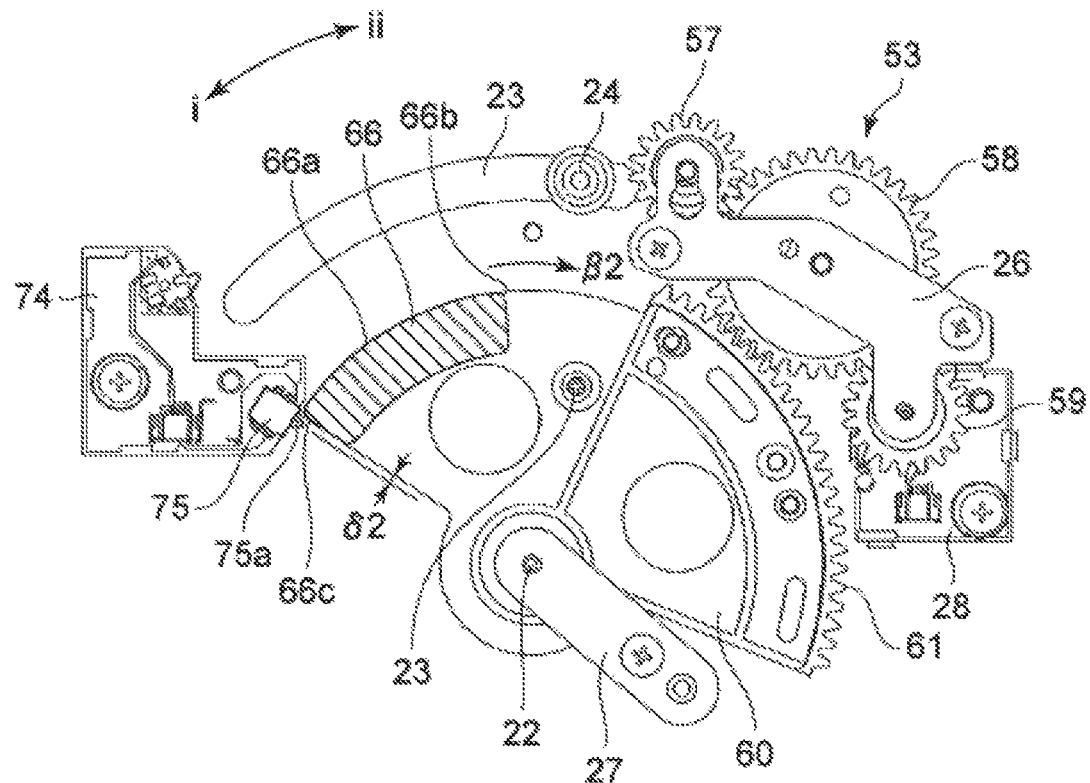
FIG. 8 is a partial right side view illustrating part of the drive mechanism when the movable member is being moved in the open direction (the second direction).

As illustrated in FIG. 4, a detection operation unit 66 is integrally formed with the sector-shaped drive rotating body 60 provided on the outside of the right side plate 21*b*. FIGS. 7 and 8 each illustrate a cross-sectional shape of the drive rotating body 60. The outer circumferential surface of the detection operation unit 66 is a detection sliding surface 66*a*. The detection sliding surface 66*a* is part of the cylindrical surface having the center at the support shaft 22 which supports the drive rotating body 60. The end, on the second direction (ii) side, of the detection sliding surface 66*a* is a first detection end 66*b*, and the end, on the first direction (i) side, of the detection sliding surface 66*a* is a second detection end 66*c*.

As illustrated in FIG. 4, a detection board 74 is fixed to the outside (X2 side) of the right side plate 21*b*, and the detection board 74 is provided with a detection switch 75. The detection operation unit 66 and the detection switch 75 constitute a detection mechanism. As illustrated in FIGS. 7 and 8, the detection switch 75 is a pressure switch having a contact point which is mechanically opened or closed, and has an actuator 75*a*. When an external force is not applied to the actuator 75*a*, the contact point is open, and the detection switch 75 is OFF, whereas when the actuator 75*a* is pressed in, the contact point is closed, and the detection switch 75 is set to ON.

In FIGS. 5 and 7, the rotatable arm 34 is in contact with the first stopper 71, and the movable member 30 is located at the "movement end point" in the first direction (i). Then the actuator 75*a* is displaced from the first detection end 66*b* of the detection operation unit 66, and the detection switch 75 is OFF. In FIGS. 6 and 8, the rotatable arm 34 is in contact with the second stopper 72, and the movable member 30 is located at the "movement end point" in the second direction (ii). Then the actuator 75*a* is displaced from the second detection end 66*c*, and the detection switch 75 is OFF. During rotation of the rotatable arm 34 and the drive rotating body 60, the actuator 75*a* is pressed in by the detection sliding surface 66*a* of the detection operation unit 66, and the detection switch 75 is set to ON.

As illustrated in FIG. 7, when the drive rotating body 60 is in contact with the first stopper 71, and located at the "movement end point" in the first direction (i), a minute distance 61 is provided between the first detection end 66*b* and the actuator 75*a*. As long as the drive rotating body 60 is rotated within a range of the minute distance δ1, the detection switch is OFF. When the drive rotating body 60 is located within a rotation range of the minute distance 61, the rotatable arm 34 and the movable member 30 are defined to be located at the "end point region" in the first direction (i). Specifically, when the drive rotating body 60 is rotated in β1 direction, and the detection switch 75 is set to OFF due to displacement of the actuator 75*a* from the first detection end 66*b*, the drive rotating body 60, the rotatable arm 34 and the movable member 30 reach the "end point region", and are further rotated in β1 direction within the "end point region", and upon contact of the rotatable arm 34 with the first stopper 71, the "movement end point" is reached.

Similarly, as illustrated in FIG. 8, when the drive rotating body 60 comes into contact with the second stopper 72 and is stopped at the "movement end point" in the second direction (ii), a minute distance δ2 is created between the second detection end 66*c* and the actuator 75*a*. When the drive rotating body 60 is rotated in a range of the minute distance δ2, the detection switch is OFF. When the drive rotating body 60 is located within the rotation range of the minute distance δ2, the rotatable arm 34 and the movable member 30 are defined to be located at the "end point region" in the second direction (ii).

Description of Circuit Block

Figure 10:
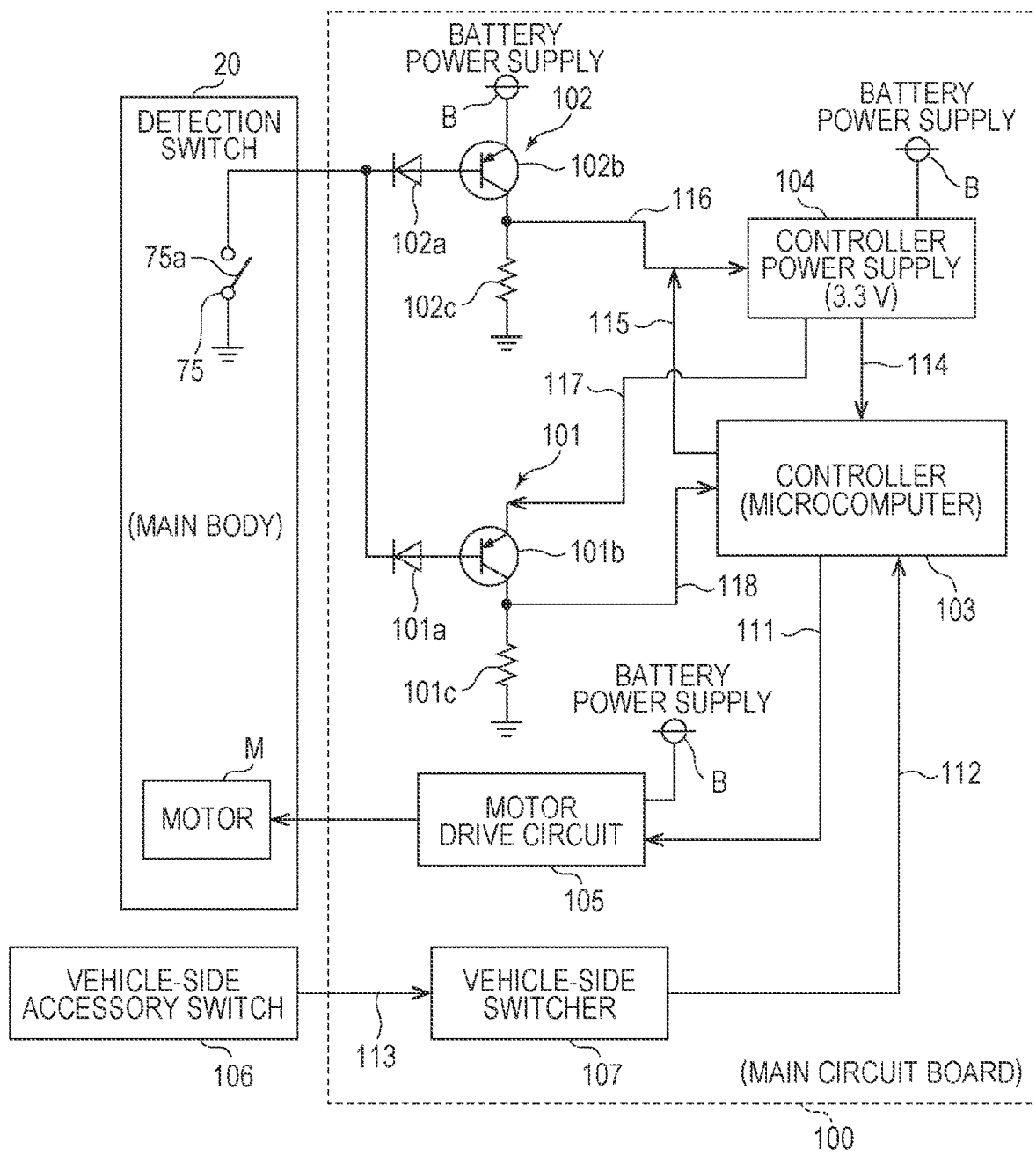
FIG. 10 is a circuit block diagram of the in-vehicle device of the embodiment of the present disclosure.

FIG. 10 illustrates a circuit block diagram of the in-vehicle device 10.

The in-vehicle device 10 has the main body 20 having the drive mechanism 50 including the motor M and the detection switch 75, and a main circuit board 100.

The main circuit board 100 is provided with a controller 103. The controller 103 comprises a microcomputer having a CPU and various memories. The controller 103 is provided with a controller power supply (power supply circuit of the microcomputer) 104. Electric power is supplied from battery B mounted on the automobile to the controller power supply 104, where 3.3V DC power 114 is converted, and supplied to the controller 103.

A motor drive circuit (motor driver) 105 is mounted on the main circuit board 100. The power supply for the motor drive circuit 105 is the battery B mounted on the automobile. When a drive command 111 is issued from the controller 103 to the motor drive circuit 105, drive power is supplied from the motor drive circuit 105 to the motor M of the motor driver 52. The main circuit board 100 is provided with a vehicle-side switcher 107. An accessory switch 106 of the automobile is the main switch, and when a switching signal 113 for the accessory switch 106 is given to the vehicle-side switcher 107, an activation signal (wakeup signal) 112 is given from the vehicle-side switcher 107 to the controller.

As illustrated in FIG. 10, the main circuit board 100 is provided with a first switching circuit 101 and a second switching circuit 102. The first switching circuit 101 has a diode 101*a* and a transistor 101*b*. 3.3 V switch electric power 117 is supplied from the controller power supply 104 to the emitter of the transistor 101*b*, and a bias resistor 101*c* is connected to the collector. The second switching circuit 102 has a diode 102*a* and a transistor 102*b*. Electric power is supplied from the battery B of the automobile to the emitter of the transistor 101*b*, and a bias resistor 102*c* is connected to the collector.

Operation When Accessory Switch 106 Serving as Main Switch is ON

Next, the operation of the in-vehicle device 10 will be described with reference to the flowchart illustrated in FIG. 11. In the flowchart, "step" in the control performed by the controller 103 is denoted by "ST".

In ST1 of FIG. 11, the operation of the in-vehicle device 10 when the accessory switch 106 serving as the main switch is ON is as shown below. The accessory switch 106 is ON in ST1, for example, when the automobile is running.

In the circuit block diagram of FIG. 10, when the accessory switch 106 serving as the main switch is set to ON, the activation signal 112 is given from the vehicle-side switcher 107 to the controller 103, to which the DC power 114 is supplied from the controller power supply 104, thereby allowing the controller 103 to perform a control operation. Then a permission signal 115 from the controller 103 is OFF, and a switching signal 116 from the second switching circuit 102 is ignored. In the first switching circuit 101, switch electric power 117 is supplied from the controller power supply 104 to the emitter of the transistor 101b, and the first switching circuit 101 can be operated by the detection switch 75. When the contact point of the detection switch 75 of the main body 20 is closed with the accessory switch 106 ON, a switching signal 118 for ON is given from the first switching circuit 101 to the controller 103.

Figure 11:
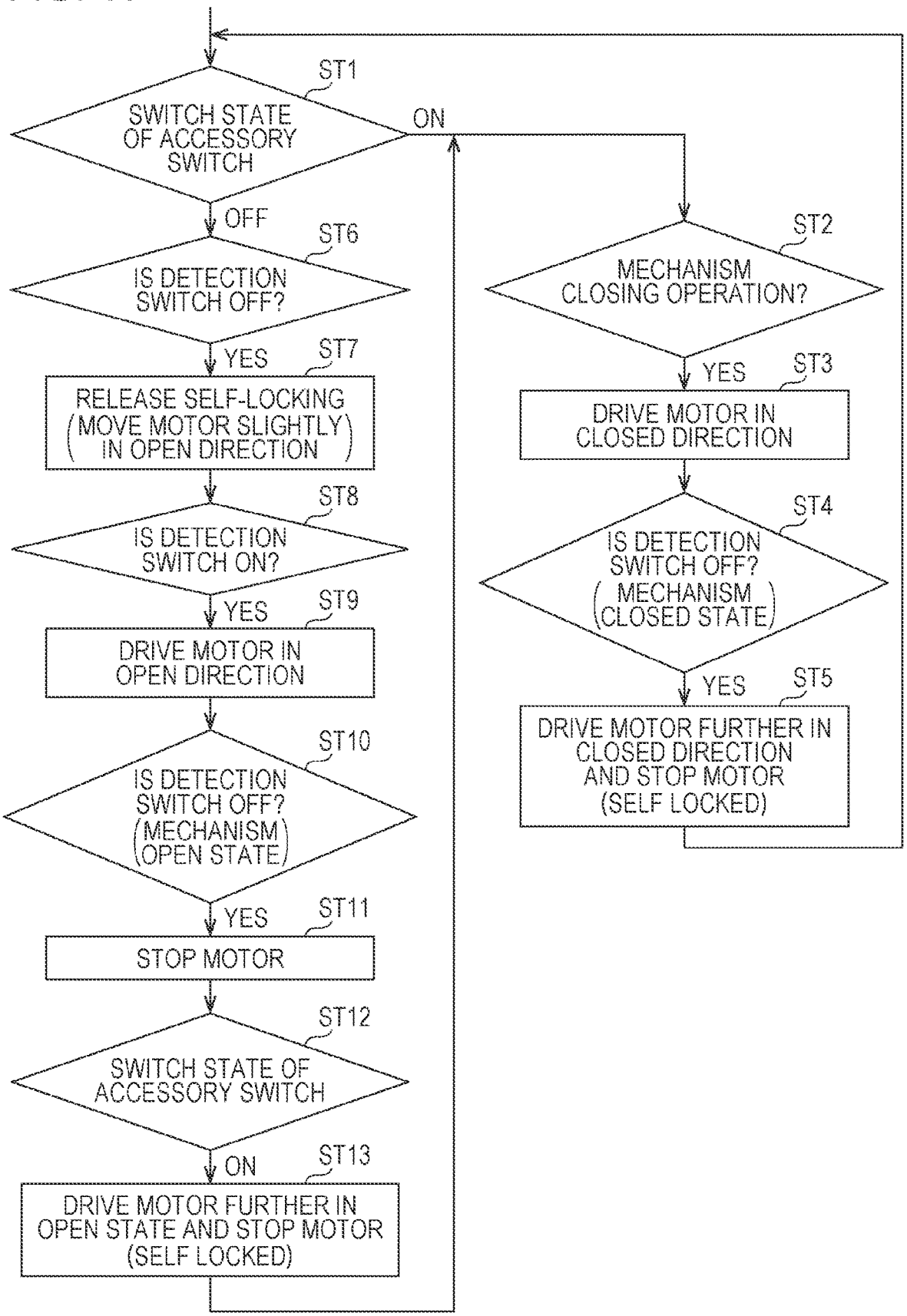
FIG. 11 is a flowchart for explaining part of the operation of the in-vehicle device of the embodiment of the present disclosure.

As illustrated in FIGS. 2 and 6, ST2 and subsequent ST illustrated in FIG. 11 show the process operations based on when the movable member 30 is stopped in the second posture (open posture) (B). When the movable member 30 is stopped in the second posture (B), as illustrated in FIG. 8, the second detection end 66c of the detection operation unit 66 provided in the drive rotating body 60 is displaced from the actuator 75a. Thus, the contact point of the detection switch 75 is in an open state, and the switching signal 118 given from the first switching circuit 101 to the controller 103 is OFF. In part of the present specification, "the switching signals 116, 118 are OFF" is described as "the detection switch 75 is OFF", and "the switching signals 116, 118 are ON" is described as "the detection switch 75 is ON".

In ST2 of FIG. 11, when an operation to shift the movable member 30 to the first posture (closed posture) (A) is performed by pressing an operation button provided on the movable member 30, a drive command 111 is issued from the controller 103 to the motor drive circuit (motor driver) 105, and in ST3, the motor M illustrated in FIG. 9 is started, and the output shaft Ma starts to rotate in α2 direction. In the driving mechanism 50, the rotational output of the motor M is transmitted through the transmission shaft 51 to the rotation driver 53 disposed on the outside of each of the left side plate 21a and the right side plate 21b. As illustrated in FIG. 8, the rotational force of the pinion gear 58 is transmitted to the sector gear portion 61 of the drive rotating body 60, and the drive rotating body 60 is driven in the counterclockwise direction (β1 direction) in FIG. 8.

When the drive rotating body 60 located on each of both right and left sides is rotated in the counterclockwise direction (β1 direction), the rotatable arm 34 along with the drive rotating body 60 is rotated in the counterclockwise direction, and the movable member 30 supported by the rotatable arm 34 is moved in the first direction (i). When the drive rotating body 60 starts to rotate in the counterclockwise direction, the actuator 75a of the detection switch 75 is immediately pressed in by the detection sliding surface 66a of the detection operation unit 66 to close the contact point of the detection switch 75, and the switching signal 118 for switch ON is given from the first switching circuit 101 illustrated in FIG. 10 to the controller 103.

In ST4 of FIG. 11, change in the switching signal 118 is monitored by the controller 103. The movement direction and the movement distance when the movable member 30 is moved can be recognized by a signal from the detection element mounted on the detection board 28. When the drive rotating body 60 is rotated in β1 direction, and the first detection end 66b of the detection operation unit 66 is displaced from the actuator 75 of the detection switch 75 as illustrated in FIG. 7, the switching signal 118 given from the first switching circuit 101 to the controller 103 is switched from ON to OFF. Then the controller 103 determines that the movable member 30 has reached the "end point region" in the first direction (i). In the "end point region", after the detection switch 75 is set to OFF, the drive rotating body 60 has rotation allowance of only the minute distance (minute angle) δ1 illustrated in FIG. 7.

In ST5, immediately after the detection switch 75 is set to OFF, the drive command 111 is issued from the controller 103 to the motor drive circuit 105, then the motor M illustrated in FIG. 9 is further driven only for a short time in α2 direction, and the drive rotating body 60 is slightly driven in β1 direction. Then the rotation angle of the detection gear 59 is detected by the detection element mounted on the detection board 28, and as illustrated in FIG. 5, at the point of determination that the rotatable arm 34 is pressed against the first stopper 71, the motor M is stopped. When the rotatable arm 34 is pressed against the first stopper 71 and the motor M is stopped, in the drive mechanism 50, teeth are pressed against each other at the engagement sections of gears from the worm 54 to the sector gear portion 61, and backlash between the gears is eliminated.

Elimination of backlash in a power transmitter of the drive mechanism 50 can regulate rattling of the rotation of the drive rotating body 60, and can achieve a self-locked state of the rotatable arm 34 and the movable member 30, in which no rattling occurs. Even when the movable member 30 is equipped with a relatively large display device 32 and the mass of the movable member 30 is increased, it is possible to reduce generation of rattling sound of the movable member 30 due to vibration of the vehicle body.

Also, when the movable member 30 is moved from the first posture (A) illustrated in FIGS. 1 and 5 to the second posture (B) illustrated in FIGS. 2 and 6 with the accessory switch ON, substantially the same operation control as in ST2 to ST5 is performed. Specifically, when an operation button is pressed in the first posture (A) of the movable member 30, the output shaft Ma of the motor M illustrated in FIG. 9 is rotated in al direction, the drive rotating body 60 and the rotatable arm 34 are driven in the clockwise direction (β2 direction), and the movable member 30 is moved in the second direction (ii). When the detection switch 75 is set to OFF, and the movable member 30 is determined to reach the "end point region" in the second direction (ii), the motor M is further moved only for a short time in β1 direction, and as illustrated in FIG. 6, the rotatable arm 34 is pressed against the second stopper 72 and the motor M is stopped. Thus, the movable member 30 is in a self-locked state in the second posture (B).

In the in-vehicle device 10 of the first embodiment, part of the drive mechanism 50 functions as a "locking mechanism unit" which causes the movable member 30 to be self-locked in the first posture (A) and the second posture (B). Specifically, in the drive mechanism 50, the power transmission path from the motor M to the rotatable arm 34 and the movable member 30 functions as the "locking mechanism unit".

Operation When Accessory Switch 106 Serving as Main Switch is OFF

Next, in ST1, the control operation when the accessory switch 106 is OFF is as follows:

In ST5, when the movable member 30 is in a self-locked state in the first posture (A) illustrated in FIGS. 1 and 5, when the accessory switch 106 serving as the main switch is set to OFF in ST1, the controller 103 checks whether or not the detection switch 75 is OFF in ST6, in other words, checks whether or not the movable member 30 is in the first posture (A). When the detection switch 75 is OFF, the flow proceeds to ST7, and self-locking is released by the "locking mechanism unit" in the drive mechanism 50.

In ST7, the self-locking is released by reversely rotating the motor M illustrated in FIG. 9 only a minute angle in a1 direction in the state of FIGS. 5 and 7. The minute angle is such an angle that allows the pressure force to the rotatable arm 34 against the first stopper 71 to be released, and causes backlash between gears to occur in the power transmission path from the worm 54 to the sector gear portion 61 of the drive rotating body 60. The backlash occurred between the gears allows the drive rotating body 60 to be freely rotated for a distance slightly longer than the minute distance 61 illustrated in FIG. 7. Then the rotation angle of the detection gear 59 is monitored by the detection element mounted on the detection board 28, and a slight drive time for the motor M is controlled so that the detection switch 75 is not switched to ON by reverse rotation of the motor M in a1 direction, and self-locking is released to achieve a state in which the drive rotating body 60 can be freely rotated in a range of the minute distance 61.

When the accessory switch 106 is set to OFF, and self-locking by the "locking mechanism unit" serving as part of the drive mechanism 50 is released in ST7, the controller 103 is in a sleep state subsequently.

When the accessory switch 106 is OFF, and the movable member 30 in the first posture (A) illustrated in FIGS. 1 and 5 is pushed upward in the second direction (ii) by a hand, the drive rotating body 60 is rotated in β2 direction for the minute distance δ1 or for a distance slightly longer than δ1 within a range of free rotation due to the backlash of the drive mechanism 50, the actuator 75a of the detection switch 75 is pressed by the detection sliding surface 66a of the detection operation unit 66, and the detection switch 75 is set to ON in ST8.

When the contact point of the detection switch 75 is closed with the accessory switch 106 OFF, the second switching circuit 102 with electric power supplied from the battery B is operated, the switching signal 116 is given to the controller power supply 104 which becomes operable, and the DC power 114 is supplied from the controller power supply 104 to the controller 103 to start the controller 103, thus a control operation can be performed. Since the switch electric power 117 is supplied from the controller power supply 104 to the first switching circuit 101, when the contact point of the detection switch 75 is closed, the first switching circuit 101 is operated, and the switching signal 118 for ON is given to the controller 103.

When the detection switch 75 is set to ON in ST8, the movable member 30 is determined to be forcibly moved again in the direction (ii) by the controller 103, the flow proceeds to ST9, and the drive command 111 is issued to the motor drive circuit (motor driver) 105 to start the motor M. The output shaft Ma of the motor M is driven in a1 direction, and the drive rotating body 60 is rotationally driven in β2 direction. The rotatable arm 34 along with the drive rotating body 60 is rotated in β2 direction, and the movable member 30 is moved in the second direction (ii) which is an open direction. When the movable member 30 is moved to the "end point region" in the second direction (ii), and second detection end 66c of the detection operation unit 66 is away from the actuator 75a of the detection switch 75 as illustrated in FIG. 8, OFF of the detection switch 75 checked in ST10, and the motor M is stopped in ST11. In ST12, the activation signal 112 of the accessory switch 106 is checked, and when the accessory switch 106 is ON, the flow proceeds to ST13, then the output shaft Ma of the motor M is rotated a minute angle in a1 direction, and the motor M is stopped with the rotatable arm 34 pressed against the second stopper 72. Thus, the movable member 30 is in a self-locked state in the second posture (B).

In the case where the movable member 30 is self-locked in the second posture (B), when the accessory switch 106 is set to OFF, the output shaft Ma of the motor M is also reversely rotated only a minute angle in α2 direction, and backlash occurs in the gear train of the "locking mechanism unit" in the drive mechanism 50, thus the self-locking is released. Thus, when the movable member 30 is pressed in the first direction (i) by a hand, the drive rotating body 60 is rotated due to the backlash, and the detection switch 75 is set to ON. Then the movable member 30 is determined to be forcibly moved again in the direction (i), and the motor M is started, then the movable member 30 is moved in the first direction (i), and is in the first posture (A) which is a closed posture.

In the in-vehicle device 10 of the above-described embodiment, when the accessory switch 106 is ON, the movable member 30 achieves a self-locked state in the first posture (A) which is a closed posture or in the second posture (B) which is an open posture, thus when vibration of the vehicle body occurs, rattling of the movable member 30 can be regulated. In addition, when the accessory switch 106 is OFF, the self-locking of the movable member 30 is released, thus the backlash of the drive mechanism 50 allows the movable member 30 to be freely moved. In other words, the detection switch 75 can be set to ON by moving the movable member 30 with a low load, and subsequently, the movable member 30 can be moved by the power of the motor M.

In the in-vehicle device 10 of the embodiment, when self-locking of the movable member 30 is released in the first posture (A) illustrated in FIG. 5, it is preferable that the drive rotating body 60 can be moved for the minute distance δ1 illustrated in FIG. 7 or for a distance longer than δ1 only by the backlash of the gear train of the drive mechanism 50, and the detection switch 75 be switched to ON only by free rotation due to the backlash of the drive rotating body 60. In this configuration, when the accessory switch 106 is set to OFF, only slight movement of the movable member 30 in the first posture (A) or the second posture (B) with a light force allows the movable member 30 to be automatically moved subsequently by the force of the motor M.

Note that when self-locking of the movable member 30 is released in the first posture (A), the angle by which the drive rotating body 60 can be freely rotated in β2 direction due to the backlash may be less than the minute distance δ1. In this case, even when the drive rotating body 60 is rotated in β1 direction in the range of the backlash after the release of self-locking, the actuator 75a of the detection switch 75 cannot be pressed by the first detection end 66b of the detection operation unit 66. However, subsequent to free movement due to the backlash, the movable member 30 is further pressed in the second direction (ii) against the load of the drive mechanism 50, thereby making it possible to switch the detection switch 75 to ON. When the movable member 30 is pressed in the second direction (ii) by a hand, initially, the movable member 30 can be freely rotated due to the backlash, thus with the same momentum, the movable member 30 can be further moved against the load of the drive mechanism 50. Consequently, the detection switch 75 can be set to ON without feeling a high load.

In the embodiment, the drive mechanism 50 includes the engagement section between the worm 54 and the worm wheel 55a. In ST5, when the rotatable arm 34 is pressed against the first stopper 71 to stop the motor M, and achieves a self-locked state, due to a pressure reaction force from the first stopper 71, a force is applied which causes the worm wheel 55a to rotate in the clockwise direction. However, an extremely large force is needed to rotate the worm 54 in α1 direction by the worm wheel 55a, and the worm 54 is not easily rotated in al direction. Therefore, when the motor M is stopped with the rotatable arm 34 pressed against the first stopper 71, the rotatable arm 34 can be self-locked in the drive mechanism 50 by a strong force. When the worm 54 is reversely rotated only a minute angle in α2 direction, and the pressure force of the rotatable arm 34 against the first stopper 71 is released, backlash occurs in the engagement sections of a plurality of gears.

Modification

In the drive mechanism 50, an electromagnetic brake may be used as the "locking mechanism unit", and when the movable member 30 is in the first posture (A) or the second posture (B), a locked state of the drive mechanism 50 may be achieved. An electromagnetic brake built in the motor M is used or an electromagnetic brake is provided in one of positions in the power transmission path of the drive mechanism 50. In the case where the accessory switch 106 is ON, when the rotatable arm 34 is pressed against the first stopper 71 or the second stopper 72 and the movable member 30 is stopped in the first posture (A) or the second posture (B), the motor M is stopped and the electromagnetic brake is operated to apply a braking force to the power transmission, and a locked state is achieved so that the drive rotating body 60 is not easily rotated. When the accessory switch 106 is set to OFF, the operation of the electromagnetic brake is cancelled, and the braking force is released. The release of the brake allows the drive rotating body 60 to be freely rotated for the minute distance δ1 or δ2 due to the backlash of the gear train of the drive mechanism 50.

As illustrated in FIGS. 7 and 8, in the in-vehicle device 10 of the embodiment, all of the following states are detected by one detection switch 75: (a) whether or not the movable member 30 has reached the "end point region" in the direction (i); (b) whether or not the movable member 30 after release of the locking in the "end point region" in the direction (i) is moved again in the direction (ii); (c) whether or not the movable member 30 has reached the "end point region" in the direction (ii); and (d) whether or not the movable member 30 after release of the locking in the "end point region" in the direction (ii) is moved again in the direction (i). Therefore, it is not necessary to provide a plural of detection switches 75. However, the present disclosure may adopt a configuration in which a plurality of detection switches are used, and (a), (b), (c), (d) are detected by different detection switches.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the invention will include all embodiments falling within the scope of the appended claims.

What is claimed is:

1. An in-vehicle device comprising:
a movable member;
a motor that moves the movable member;
at least one detection switch that detects movement of the movable member; and,
a controller that controls the motor based on a detected output of the detection switch,
wherein the in-vehicle device further includes:
a locking mechanism unit that, upon determination by the controller based on the detected output from the detection switch that the movable member reaches an end point region in a movement direction, locks the movable member, and upon determination by the controller that a main switch is set to OFF, releases the lock; and
a motor driver that, after the release of the lock by the locking mechanism unit, upon determination by the controller based on the detected output from the detection switch that the movable member is moved again, drives the motor to move the movable member.

2. The in-vehicle device according to claim 1, wherein in the locking mechanism unit:
when the movable member is moved in a first direction, and the movable member is determined to reach the end point region based on the detected output from the detection switch, the motor is driven in a direction for which the movable member is pressed in the first direction, then stopped to eliminate occurrence of backlash in a gear in a power transmission path in a drive mechanism, and the movable member is self-locked,
when the main switch is set to OFF, the self-locking is released by causing backlash to occur in the gear, and,
when the movable member is moved with the backlash occurred, the movable member is determined to be moved again.

3. The in-vehicle device according to claim 2, further comprising:
a stopper that regulates movement of the movable member in the first direction, wherein in the locking mechanism unit, backlash is eliminated by pressing the movable member against the stopper by power of the motor.

4. The in-vehicle device according to claim 2, wherein in the locking mechanism unit, when the main switch is set to OFF, the motor is driven for a short time in a rotational direction for causing the movable member to move in a second direction so that backlash occurs, the second direction being opposite to the first direction.

5. The in-vehicle device according to claim 2, further comprising:
an engagement section between a worm and a worm wheel provided in an output shaft of the motor.

6. The in-vehicle device according to claim 1, wherein the locking mechanism unit is an electromagnetic brake provided in a power transmission path from the motor to the movable member.

7. The in-vehicle device according to claim 1, wherein the main switch is an accessory switch of an automobile.

* * * * *